June 6, 1950 J. R. TEICHMAN 2,510,728
ROTARY CUTTER VINE LIFTER
Filed Jan. 16, 1948 2 Sheets-Sheet 2

INVENTOR.
Joseph R. Teichman,
BY Victor J. Evans & Co.
ATTORNEYS

Patented June 6, 1950

2,510,728

UNITED STATES PATENT OFFICE 2,510,728

ROTARY CUTTER VINE LIFTER

Joseph R. Teichman, Perry, Mich.

Application January 16, 1948, Serial No. 2,785

1 Claim. (Cl. 56—314)

The present invention relates to a rotary cutter and vine lifter, and in particular to a rotary cutter lifter adapted to be attached to a tractor when cutting banked or hilled-up row crops.

One object of the invention is to provide a rotary cutter which is adapted to be attached to a conventional tractor in such a manner as to cut various crops grown in rows or drills which have been hilled-up, to promote growth and to arrange the cutter to rotate in a horizontal plane whereby the crops will be cut in close relation to the ground surface.

Another object is to provide a rotary cutter which is adapted to be attached to the rear of a conventional tractor in alignment with the longitudinal center of the tractor, so that when the tractor straddles the slant row or drill, the cutter axis will coincide with the center of the plant row and permit the rotary cutter to cut the plants or vines adjacent the ground surface in an arcuate swath.

Another object is to provide a rotary cutter attachment for tractors in which a pair of shoes are arranged forwardly of the cutter on opposite sides of the longitudinal center of the tractor and the vertical cutter axis to elevate or raise vines and other plants from the ground surface before the blades of the cutter engage and cut said vines and plants.

Another object is to provide a rotary cutter attachment for tractors which is provided with guide bars mounted on the vine lifting shoes immediately forward of said rotary cutter for directing plants and vines inwardly into the path of the rotary cutter blades.

In the drawings—

Figure 1:
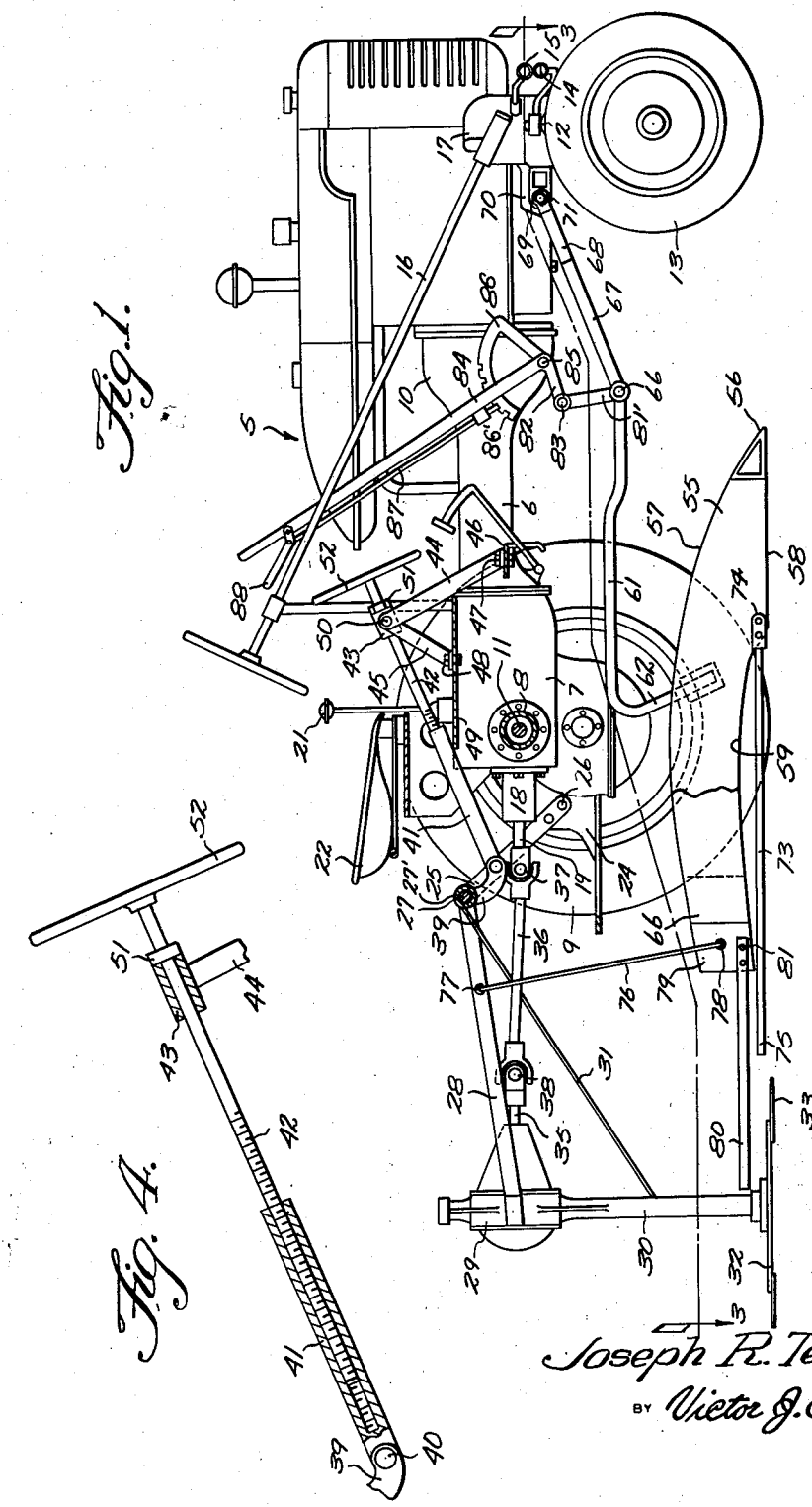
Figure 1 is a side elevational view of the rotary cutter attachment showing the manner in which the device is applied to a tractor and illustrating the position of the vine and plant lifting shoes in advance of the rotary cutter.
Figure 2:
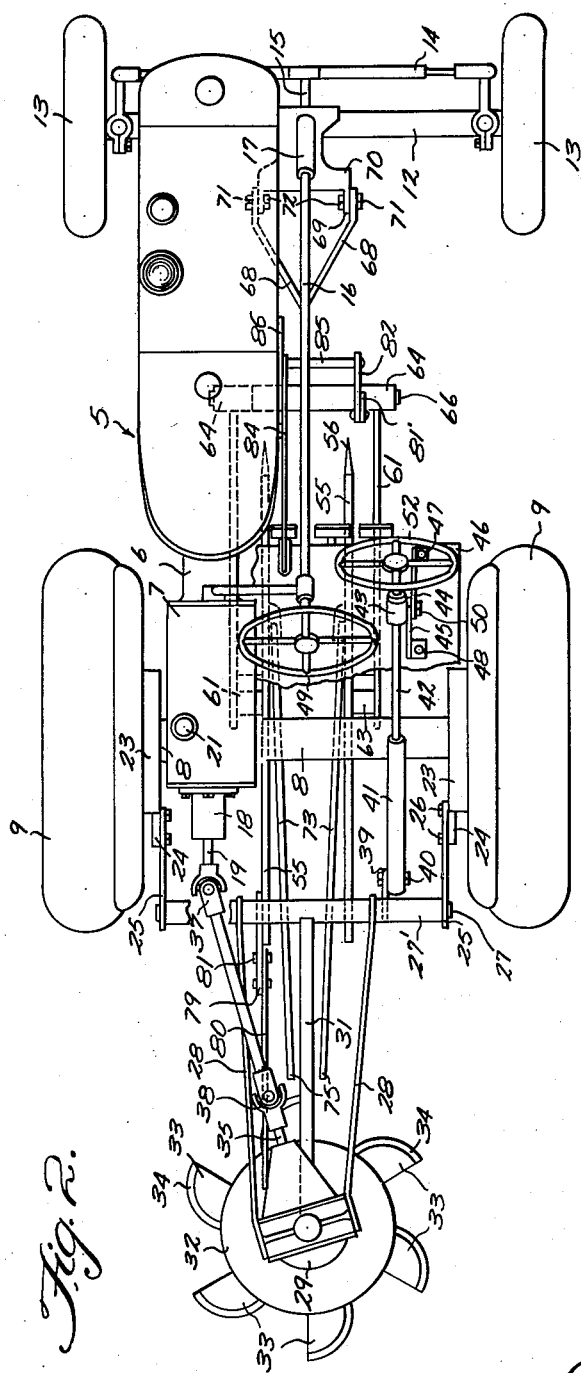
Figure 2 is a top elevational view of the rotary cutter showing further the manner in which the cutter is positioned on the tractor and arranged centrally with respect to the longitudinal center of the tractor.

In the drawings, for the purpose of illustration, there is shown a tractor generally indicated at 5, to which the rotary cutter is adapted to be attached. For convenience of illustration, the tractor includes a tubular frame structure 6 having its rear end connected to a transmission housing 7 which is provided with axle housing 8 extending laterally therefrom, and through which extends drive axles 11 for the supporting traction wheels 9. The forward portion of the tubular frame structure 6 is provided with an enlarged portion 10 which is bolted to the motor, not shown, so that the crankshaft of the motor can be drivingly connected to the drive shaft extending through the tubular housing 6 and into the gear housing 7. The front end of the motor 11 is supported on a transverse axle 12 having steering wheels 13 at the ends thereof, with their stub shafts connected by means of a link 14, having a steering connection 15 with the steering shaft 16. Suitable gearing is interposed between the steering connection 15, and said gearing is mounted in a housing 17 bolted or otherwise affixed to the motor frame structure 11.

Extending rearwardly from the transmission housing 7 through a reduced housing portion 18 is a power take-off shaft 19 which is adapted to be controlled by a gear shaft lever 21 adjacent the driver's seat 22 (Figure 1). Formed integral with the axle housings 8 is the conventional brake housing 23 on each end thereof, and extending rearwardly from each housing is a curved flange 24 which extends partially around the brake drum housing, and generally forms a support for conventional farm equipment.

Secured to each of the rearwardly extending flanges 24 is an upwardly extending inclined arm 25 to provide a pair of spaced supports held in place by screws or the like as at 26. The free ends of the arms 25 are connected by means of a transverse shaft 27 having its ends welded to arms 25. Secured on the tube 27' in spaced apart relation is a pair of rearwardly extending bracket arms 28, the free ends of which are connected as by means of welding to a gear housing 29 of the type used in automobile differentials, having a tubular shaft 30 extending downwardly therefrom. A brace rod 31 has its end connected to the tubular shaft 30 (Figure 1), and its opposite end connected to the tube 27' to thereby brace the tubular shaft 30, but yet permit vertical swinging movement thereof, about the horizontal axis of the shaft 27. The tubular shaft 30 is provided with a drive shaft 30' supported in suitable bearings (not shown), at the top and bottom of the shaft 30, and a rotary cutter disc 32 is mounted on the lower end of said shaft for rotation therewith and is provided with a series of circumferentially spaced cutter blades 33 of sector shape, providing curved cutting edges 34. The cutting edges may be roughened as by hammering and then sharpened to provide a relatively sharp cutting edge 34.

Supported in suitable bearings in the gear housing 29 is a shaft 35 which is drivingly connected to the rotary cutter shaft by suitable gearing, and the shaft 35 is adapted to be driven from the power take-off shaft 19 of the tractor by means of an intermediate shaft 36 having universal bearing couplings 37 and 38 with the power take-off shaft 19 and shaft 35 respectively.

It will thus be seen that the rotary cutter 32 will be driven from the power take-off shaft 19 to rotate the cutter in a counter-clockwise direction through the power take-off.

Figure 3:
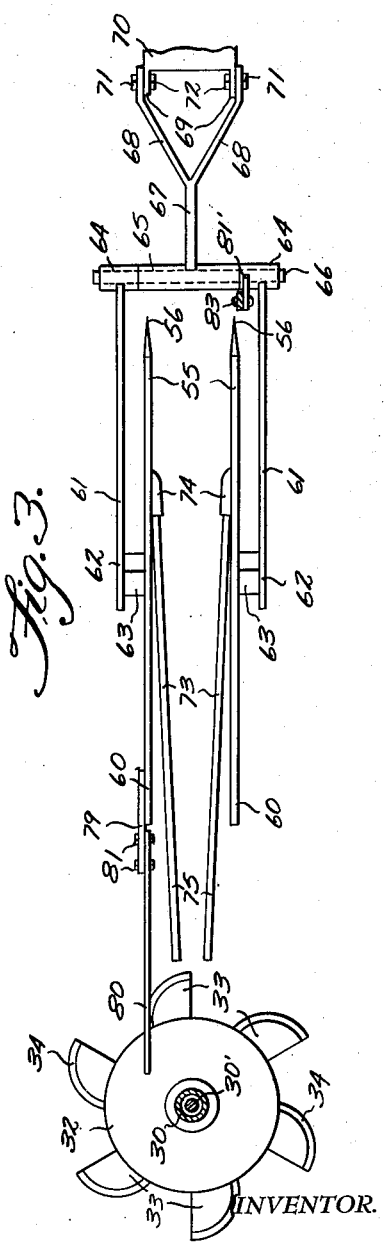
Figure 3 is a top elevational view of the vine and plant lifting shoes and guide rods for directing plants and vines into the path of the rotary cutter, and, Figure 4 is an enlarged fragmentary side elevational view of the rotary cutter lifting mechanism showing portions thereof in section to illustrate various details of construction.

Connected to the shaft 27, as by welding or the like, is an arm 39, to which is pivoted as at 40, a tubular shaft 41 having internal screw threads for receiving a threaded shaft 42, so that the tubular shaft 41 and shaft 42 telescope one within the other. The upper end of the threaded shaft 42 is journaled in a bearing 43, supported on the tractor frame structure 6 by suitable brackets 44 and 45. One of the brackets 44 is bolted at its lower end to the tractor floor board 46, as at 47, while the other bracket arm 45 is bolted as at 48 to the portion 49 of the floor board 46. Trunnion bearings 50 are formed integral with the bearing 43 and extend through aligned openings in the upper ends of the supporting brackets 44 and 45, there being supporting brackets on one side of the bearing 43 only, as shown in Figure 3. A collar 51 (Figure 4), is affixed to the upper end of the screw threaded control shaft 42 for preventing axial movement thereof, and a hand wheel 52 secured to the extreme upper end of the screw threaded shaft 42 is positioned adjacent the steering wheel of the steering shaft 16 within easy reach of the driver. Thus, the control shaft 52 may be rotated to swing the tubular shaft 39, and the cutter 32—33 vertically about the horizontal pivot axis of the shaft 27.

Supported beneath the tractor and forwardly of the rotary cutter disc 32 is a pair of vine lifting shoes 55 which have pointed ends 56 to engage beneath the vines on opposite sides of a plant row to lift the vines upwardly along the inclined curved surface and top edge of each shoe. The lower edge 58 is straight for a portion of its length, and curves upwardly as at 59 and terminated in a rear portion 60. A pair of spaced supporting arms 61 have their rear ends bent downwardly and forwardly as at 62, and are attached to blocks 63 fastened to the sides of the vine lifting shoes 55 (Figure 3). The forward ends of the supporting arms 61 are provided with transverse tubular bearing members 64, and are adapted to be spaced by means of a tubular bearing shaft 65 interposed therebetween. A shaft 66 extends through the tubular bearing sleeve 64 and the shaft 65, and cotter keys not shown or the like may be provided on the ends of the shaft 66 for preventing displacement of the tubular bearing sleeve 64. A bracket arm 67 is connected to the tubular bearing shaft 65, and said bracket arm is provided with diverging arms 68 which are pivotally connected to a pair of spaced lugs 69 on the cultivator attachment bracket of the tractor as at 70. The bracket 70 is secured to the engine frame 11 in a conventional manner. Bolts 71 (Figure 3), are provided for pivotally connecting the ends of the diverging arms 68 to the spaced lugs 69, and retaining nuts 72 are threaded on the bolts to prevent displacement thereof.

Secured to the opposed walls of the vine lifting shoes 55 is a pair of divergent wooden bars 73 which are fastened in place by suitable brackets 74, and have their free ends 75 spaced a slight distance apart and terminating in spaced relation from the rotary cutter 32 so as to direct vines and plants into the path of the rotary cutter. The rear end 60 of one of the vine lifting shoes 55 is supported from the tubular shaft supporting arm 28 by means of a bar 76 which has one end extending through an opening in the arm 28, as at 77, and the lower end extending into an opening 78 in an extension 79 affixed to the rear end of this shoe 55, as shown in Figures 1 and 3.

Affixed to the extension 79, is a rearwardly projecting bar 80, which is held in place by fastening means 81 such as nuts and bolts, and the end of the bar overlies the rotating cutting disc 32 to prevent vines and plants from being thrown laterally when engaged by the cutters 33.

In order to raise the vine lifting shoes 55 from ground engagement, an arm 81' is affixed to one of the bearing sleeves 64 (Figure 3), and the upper end of the arm is attached to an extension 82 as at 83 of a control lever 84. The control lever 84 is pivoted to a stud 85 affixed to the enlarged portion 10 of the tubular frame 6, so that swinging movement of the control lever 84 will raise the front end of the shoes 55. A second arm 86 is secured to the enlarged portion 10 of the tubular frame structure, and is provided with a series of notches 86' for receiving the end of a locking rod 87 slidably mounted on the control lever 84, and adapted to be operated by a handle 88. When the control handle or shaft 84 is swung about its pivot point 85 in a clockwise direction (Figure 1), the levers 61 and 67 will be elevated, and since the arms 61 have their rear ends rigidly affixed to the vine lifting shoes 55, the front ends of the shoes will be elevated.

In order to elevate the rear ends of the vine lifting shoes 55, and the cutter disc 32, the control wheel 52 is operated to swing the tubular shaft 30 vertically about the horizontal axis of the shaft 27. When the arms 28 are thus swung upwardly, the rods 67 connecting the arms 28 and the rear ends of the vine lifting shoes 55, said rear ends will be elevated a corresponding distance.

In operation, the tractor is driven over the plant row so that the vine lifting shoes 55 straddle the same, and when the tractor is propelled forwardly the vines or plants are lifted upwardly to an erect position before being engaged by the rotary cutting blades 33. During the forward movement of the tractor the divergent rods 73 bunch the lifted vines and plants so that they will be gathered in position before being engaged by the cutters 33.

The various adjustments may be accomplished by manipulating the control wheel 52 and lever 84 to elevate the vine lifting shoes to the correct position, as well as the cutter with respect to the ground surface.

What I claim is:

In a vine lifting means for use with a tractor having a rotary cutting mechanism attached thereto, the improvement comprising, a pair of vine lifting shoes, having pointed forward ends adapted to engage the vines, said shoes having a forward flat bottom edge and a curved rear bottom edge merging into said straight edge, a pair of supporting arms connected to said shoes, a bracket carried by said tractor and having the free ends of the supporting arms pivoted thereto, a pair of inwardly diverging arms fixed at one end to said shoes to direct the vines into the path of the rotary cutter, lifting links connected to said supporting arms for lifting the vine lifting shoes, a rearwardly projecting bar fixed to one of said vine lifting shoes and said bar overlying said rotary cutter means to prevent said rotary cutting means from throwing the vines laterally of the cutting means.

JOSEPH R. TEICHMAN.

REFERENCES CITED

The following references are of record in the file of this patent:

UNITED STATES PATENTS

| Number | Name | Date |
|---|---|---|
| 121,123 | Owen | Nov. 21, 1871 |
| 1,397,365 | Cook | Nov. 15, 1921 |
| 1,830,871 | Domagala | Nov. 10, 1931 |
| 1,926,338 | Johnston | Sept. 12, 1933 |
| 2,064,480 | Lock et al. | Dec. 15, 1936 |
| 2,243,248 | Clark et al. | May 27, 1941 |
| 2,411,623 | Jaques | Nov. 26, 1946 |